United States Patent
Ferguson, Jr.

(10) Patent No.: US 8,566,365 B1
(45) Date of Patent: Oct. 22, 2013

(54) DIGITAL ASSET HOSTING AND DISTRIBUTION

(75) Inventor: Edmund Brown Ferguson, Jr., Libertyville, IL (US)

(73) Assignee: Facebook, Inc., Menlo Park, CA (US)

( * ) Notice: Subject to any disclaimer, the term of this patent is extended or adjusted under 35 U.S.C. 154(b) by 169 days.

(21) Appl. No.: 13/082,862

(22) Filed: Apr. 8, 2011

Related U.S. Application Data

(63) Continuation of application No. 11/556,529, filed on Nov. 3, 2006, now Pat. No. 7,937,422.

(60) Provisional application No. 60/732,635, filed on Nov. 3, 2005, provisional application No. 60/732,645, filed on Nov. 3, 2005.

(51) Int. Cl.
*G06F 17/30* (2006.01)

(52) U.S. Cl.
USPC ............................ 707/803; 707/612; 707/640

(58) Field of Classification Search
USPC .......... 707/640, 802, 803, 612, 622; 704/270, 704/275; 709/310; 345/156
See application file for complete search history.

(56) References Cited

U.S. PATENT DOCUMENTS

| | | | |
|---|---|---|---|
| 6,192,340 B1 | 2/2001 | Abecassis | |
| 6,832,242 B2 * | 12/2004 | Keskar | 709/204 |
| 6,970,840 B1 * | 11/2005 | Yu et al. | 705/27.1 |
| 7,890,544 B2 * | 2/2011 | Swartz et al. | 707/803 |
| 2002/0083234 A1 | 6/2002 | Izawa | |
| 2003/0093790 A1 | 5/2003 | Logan et al. | |
| 2004/0086120 A1 | 5/2004 | Akins et al. | |
| 2005/0021470 A1 | 1/2005 | Martin et al. | |
| 2005/0216855 A1 | 9/2005 | Kopra et al. | |
| 2005/0251807 A1 | 11/2005 | Weel | |
| 2007/0101373 A1 | 5/2007 | Bodlanender et al. | |

OTHER PUBLICATIONS

Office Action, U.S. Appl. No. 11/025,592, dated Nov. 3, 2006, 10 pages.
"Audible.com—Audio That Speaks to You Wherever You Are", Retrieved From the Internet: http://www.audible.com, on Nov. 3, 2005, 2 pages.
"Audible.com—Sample Audio", Retrieved From the Internet: http://www.audible.com, on Nov. 3, 2005, 2 pages.
"Audible.com—How Audio Works", Retrieved From the Internet: http://www.audible.com, on Nov. 3, 2005, 3 pages.
"Connect—Music Downloads Powered by Sony", Retrieved From the Internet: http://musicstore.connect.com/, on Nov. 3, 2005, 2 pages.

(Continued)

*Primary Examiner* — Shahid Alam
(74) *Attorney, Agent, or Firm* — Keller Jolley Preece

(57) ABSTRACT

A first collection of content that includes digital assets is maintained on a host computer. Based on a determination that a portable media device becomes connected to a client computer that is separate from the host computer and that interacts with the host computer, initiation of a synchronization of the first collection of content resident on the host computer with a second collection of content on the portable media device is automatically triggered. The synchronization of the first collection with the second collection includes a transfer of at least one of the digital assets from the host computer to the client computer to the portable media device and is triggered and conditioned upon the determination that the portable media device has become connected to the client computer.

23 Claims, 11 Drawing Sheets

(56) References Cited

OTHER PUBLICATIONS

"Connect—Welcome to the Connect Music Store", Retrieved From the Internet: http://musicstore.connect.com/promos/dc/take_tour.html, on Nov. 3, 2005, 2 pages.
"Kazaa Gold—Free Unlimited Music Downloads From Your Favorite Artists", Retrieved From the Internet: http://www.mykazaa-gold.com/?Its=AOL_US_CAN_$0.94_music%20online, on Nov. 3, 2005, 1 page.
"Kazaa Gold—Frequently Asked Questions", Retrieved From the Internet: http://wvvw.mykazaa-gold.com/faq.php, on Nov. 3, 2005, 3 pages.
"Grokster—Get Grokster Pro", Retrieved From the Internet: http://www.grokster.com/, on Nov. 3, 2005, 1 page.
"iTunes 6—The Best Digital Jukebox and #1 Music Download Store" Retrieved From the Internet: http://www.apple.com/itunes/ on Nov. 3, 2005, 3 pages.
"The Best Digital Jukebox and #1 Music Download Store. Now With Video." Retrieved From the Internet: http://www.apple.com/itunes/overview/, on Nov. 3, 2005, 2 pages.
"Download iTunes 6" Retrieved From the Internet: http://www.apple.com/itunes/download/, on Nov. 3, 2005, 2 pages.
"Your 24-7 Video Store" Retrieved From the Internet: http://www.apple.com/itunes/videos/, on Nov. 3, 2005, 2 pages.
"iPod Shuffle—Give Chance a Chance" Retrieved From the Internet: http://www.apple.com/ipodshuffle/, on Nov. 3, 2005, 2 pages.
"The New iPod" Retrieved From the Internet: http://www.apple.com/ipod/ipod.html, on Nov. 3, 2005, 3 pages.
"LimeWire 4.9", Retrieved From the Internet: http://www.limewire.com/english/content/home.shtml, on Nov. 3, 2005, 1 page.
For Turbo Charged Downloads, Use LimeWire PRO, Retrieved From the Internet: http://www.limewire.com/english/content/download.shtml, on Nov. 3, 2005, 1 page.
"LimeWire is the Flagship Client on the Gnutella Network", Retrieved From the Internet: http://www.limewire.org, on Nov. 3, 2005, 2 pages.
"Lime Wire Is Proud to Announce the Release of LimeWire 4.9.37", Retrieved From the Internet: http://www.limewire.com/english/content/features.shtml, on Nov. 3, 2005, 2 pages.
"What is LimeWire?", Retrieved From the Internet: http://www.limewire.com/english/content/company.shtml, on Nov. 3, 2005, 2 pages.
"MP3 Music Downloads—Buy MP3 Music Online—Digital Music Downloads", Retrieved From the Internet: http://www.mp3.com/, on Nov. 3, 2005, 5 pages.
"Musicmatch Jukebox—World's Best Music Player", Retrieved From the Internet: http://www.musicmatch.com/, on Nov. 3, 2005, 1 page.
"New Musicmatch Jukebox Plus 10—The Best Media Player for Music", Retrieved From the Internet: http://www.musicmatch.com/download/plus/jukebox_intro.htm, on Nov. 3, 2005, 2 pages.
"Musicmatch On Demand", Retrieved From the Internet: http://www.musicmatch.com/download/ondemand_intro.htm, on Nov. 3, 2005, 1 page.
"Musicmatch Radio", Retrieved From the Internet: http://www.musicmatch.com/download/radio_intro.htm?OS=pc, on Nov. 3, 2005, 1 page.
"Musicmatch Music Store", Retrieved From the Internet: http://www.musicmatch.com/download/music_intro.htm?OS=pc, on Nov. 3, 2005, 1 page.
"Napster—All the Music You Want. Any Way You Want It.", Retrieved From the Internet: http://www.napster.com/?affiliate_id=88&referral_id=CJ&AID=8353205&PID=1555503, on Nov. 3, 2005, 2 pages.
"Napster—Search for Music", Retrieved From the Internet: http://www.napster.com/search_music.html, on Nov. 3, 2005, 3 pages.
"Napster—More About Napster", Retrieved From the Internet: http://www.napster.com/more_about_napster.html, on Nov. 3, 2005, 2 pages.
"Napster—Frequently Asked Questions", Retrieved From the Internet: http://www.napster.com/faq.html, on Nov. 3, 2005, 3 pages.
"Rhapsody—Premium Music Subscription Service", Retrieved From the Internet: http://www.real.com/dmm/rhapsody, on Nov. 3, 2005, 1 page.
"Yahoo! Music", Retrieved From the Internet: http://music.yahoo.com/, on Nov. 3, 2005, 2 pages.
"Yahoo! Music Engine: Rip, Play, Burn, Manage and Explore Music—for Free", Retrieved From the Internet: http://music.yahoo.com/musicengine/, on Nov. 3, 2005, 2 pages.
"LAUNCHcast Home", Retrieved From the Internet: http://music.yahoo.com/launchcast/setup.asp, on Nov. 3, 2005, 3 pages.

* cited by examiner

DIGITAL ASSET HOSTING AND DISTRIBUTION

CROSS-REFERENCE TO RELATED APPLICATIONS

This present application is a continuation of U.S. application Ser. No. 11/556,529, filed on Nov. 3, 2006 (now U.S. Pat. No. 7,937,422), which claims priority from U.S. provisional application No. 60/732,635 filed Nov. 3, 2005 and titled "Digital Asset Hosting and Distribution" and No. 60/832,645 filed Nov. 3, 2005 and titled "Digital Asset Hosting and Distribution," the entire contents of each of which are incorporated herein by reference.

TECHNICAL FIELD

This description relates to hosting and distributing digital assets.

BACKGROUND

It may be useful to store digital assets on a host computer and to transfer such hosted digital assets to client computers or portable media devices.

SUMMARY

In one aspect, a first collection of content that includes digital assets is maintained on a host computer. Based on a determination that a portable media device becomes connected to a client computer that is separate from the host computer and that interacts with the host computer, initiation of a synchronization of the first collection of content resident on the host computer with a second collection of content on the portable media device is automatically triggered. The synchronization of the first collection with the second collection includes a transfer of at least one of the digital assets from the host computer to the client computer to the portable media device and is triggered and conditioned upon the determination that the portable media device has become connected to the client.

Implementations may include one or more of the following features. For example, the first collection may be a hosted user account, the second collection may be a portable media device user account, and the digital assets may be songs. In addition, the second collection may not be identical to the first collection.

The synchronization of the first collection of content with the second collection of content may include a synchronization of the first collection of content resident on the host computer with a third collection of content resident on the client computer and a synchronization of the third collection of content resident on the client computer with the second collection of content resident on the portable media device. The synchronization of the first collection with the third collection may include a transfer of the at least one digital asset from the host computer to the client computer, and the synchronization of the third collection with the second collection may include a transfer of the at least one digital asset from the client computer to the portable media device. The third collection may be a client user account.

In another aspect, a first collection of content including digital assets is maintained on a host computer. The first collection of content on the host computer is automatically modified and, in response to automatically modifying the first collection of content on the host computer, initiation of a synchronization of the first collection of content resident on the host computer with a second collection of content resident on a portable media device connected to a client computer that is separated from the host computer and that interacts with the host computer is automatically initiated. The synchronization of the first collection with the second collection includes a transfer of at least one of the digital assets from the host computer to the client computer to the portable media device.

Implementations may include one or more of the following features. For example, the first collection may be a hosted user account, the second collection may be a portable media device user account, and the digital assets may be songs.

The synchronization of the first collection of content resident on the host computer with the second collection of content on the portable media device may include a synchronization of the first collection of content resident on the host computer with a third collection of content resident on the client computer and a synchronization of the third collection of content resident on the client computer with the second collection of content resident on the portable media device. The synchronization of the first collection with the third collection may include the transfer of the at least one digital asset from the host computer to the client computer, and the synchronization of the third collection with the second collection may include the transfer of the at least one digital asset from the client computer to the portable media device.

A second collection of content may be maintained on the host computer, and the first collection of content may be linked to the second collection of content. In response to a determination that the second collection of content has been modified, the first collection of content may be automatically modified to reflect the content of the second collection. The first collection of content may be a dynamically generated playlist, and automatically modifying the first collection of content may include updating the dynamically generated playlist.

In another aspect, a system includes a client computer that is separate from a host computer, and a client application resident on the client computer. The client computer is to configured to interact with the host computer and a portable media device. The host computer includes a hosted collection of content that includes at least one digital asset. The portable media device includes a device collection of content and is configured to enable the portable media device to be connected to the client computer. The client application is configured to determine that the portable media device has become connected to the client computer and to automatically trigger initiation of a synchronization of the hosted collection with the device collection based on a determination that the portable media device has become connected to the client computer. The synchronization of the hosted collection with the device collection includes a transfer of at least one of the digital assets from the host computer to the client computer to the portable media device and is triggered and conditioned upon the determination that the portable media device has become connected to the client computer.

Implementations may include one or more of the following features. For example, the client computer may include a client collection of content, and the synchronization of the hosted collection with the device collection may include a synchronization of the hosted collection with the client collection and a synchronization of the client collection with the device collection. The synchronization of the hosted collection with the client collection may include the transfer of the at least one digital asset from the host computer to the client computer, and the synchronization of the client collection with the device collection may include the transfer of the at least one digital asset from the client computer to the portable media device.

The client computer may include a client collection of content. The client application may be configured to automatically initiate an update of the content of the client collection to reflect the content of the hosted collection on a periodic basis. Additionally or alternatively, the client application may be configured to automatically initiate an update of the content of the client collection to reflect the content of the hosted collection in response to the client computer being powered on or in response to a user instruction.

In another aspect, a system includes a host computer including a hosted collection of content that includes at least one digital asset. The host computer is configured to interact with a client computer that is separate from the host computer, and the client computer is configured to interact with a portable media device. The portable media device includes a device collection of content and is configured to enable the portable media device to be connected to the client computer. In addition, the client computer is further configured to determine that the portable media device has become connected to the client computer and to automatically trigger initiation of a synchronization of the hosted collection with the device collection based on a determination that the portable media device has become connected to the client computer. The synchronization of the hosted collection with the device collection includes a transfer of at least one of the digital assets from the host computer to the client computer to the portable media device and is triggered and conditioned upon the determination that the portable media device has become connected to the client computer.

Implementations may include one or more of the following features. For example, the hosted collection may include a hosted user account that includes a dynamically generated playlist, and the host computer may be configured to modify the dynamically generated playlist automatically.

The client computer may include a client collection of content, and the synchronization of the hosted collection with the device collection may include a synchronization of the hosted collection with the client collection and a synchronization of the client collection with the device collection. The synchronization of the hosted collection with the client collection may include the transfer of the at least one digital asset from the host computer to the client computer, and the synchronization of the client collection with the device collection may include the transfer of the at least one digital asset from the client computer to the portable media device.

The client computer may include a client collection of content, and the host computer may be configured to automatically initiate an update of the content of the client collection to reflect the content of the hosted collection on a periodic basis. Additionally or alternatively, the client computer may be configured to automatically initiate an update of the content of the client collection to reflect the content of the hosted collection in response to the client computer being powered on or the host computer may be configured to automatically initiate an update of the content of the client collection to reflect the content of the hosted collection in response to a user instruction.

In another aspect, a computer program product includes instructions that, when executed by a processor, cause the processor to determine if a portable media device becomes connected to a client computer that is separate from a host computer and that interacts with the host computer, and automatically trigger initiation of a synchronization of a first collection of content that includes digital assets and is resident on the host computer with a second collection of content on the portable media device based on a determination that the portable media device has become connected to the client computer. The synchronization of the first collection with the second collection includes a transfer of at least one of the digital assets from the host computer to the client computer to the portable media device and is triggered and conditioned upon the determination that the portable media device has become connected to the client computer.

Implementations may include one or more of the following features. For example, the first collection may be a hosted user account, the second collection may be a portable media device user account, and the digital assets may be songs. In addition, the second collection may not be identical to the first collection.

The synchronization of the first collection of content with the second collection of content may include a synchronization of the first collection of content resident on the host computer with a third collection of content resident on the client computer and a synchronization of the third collection of content resident on the client computer with the second collection of content resident on the portable media device. The synchronization of the first collection with the third collection may include a transfer of the at least one digital asset from the host computer to the client computer, and the synchronization of the third collection with the second collection may include a transfer of the at least one digital asset from the client computer to the portable media device. The third collection may be a client user account.

The computer program product may include instructions that, when executed, cause the processor to automatically initiate an update of the content of the third collection to reflect the content of the first collection on a periodic basis. Additionally or alternatively, the computer program product may include instructions that, when executed, cause the processor to automatically initiate an update of the content of the third collection to reflect the content of the first collection in response to the client computer being powered on or in response to a user instruction.

Implementations of the described techniques may include hardware, a method or process, or computer software on a computer-accessible medium. The details of one or more implementations are set forth in the accompanying drawings and the description below. Other features will be apparent from the description and drawings.

DESCRIPTION OF DRAWINGS

Like reference symbols in the various drawings indicate like elements.

DETAILED DESCRIPTION

Figure 1:
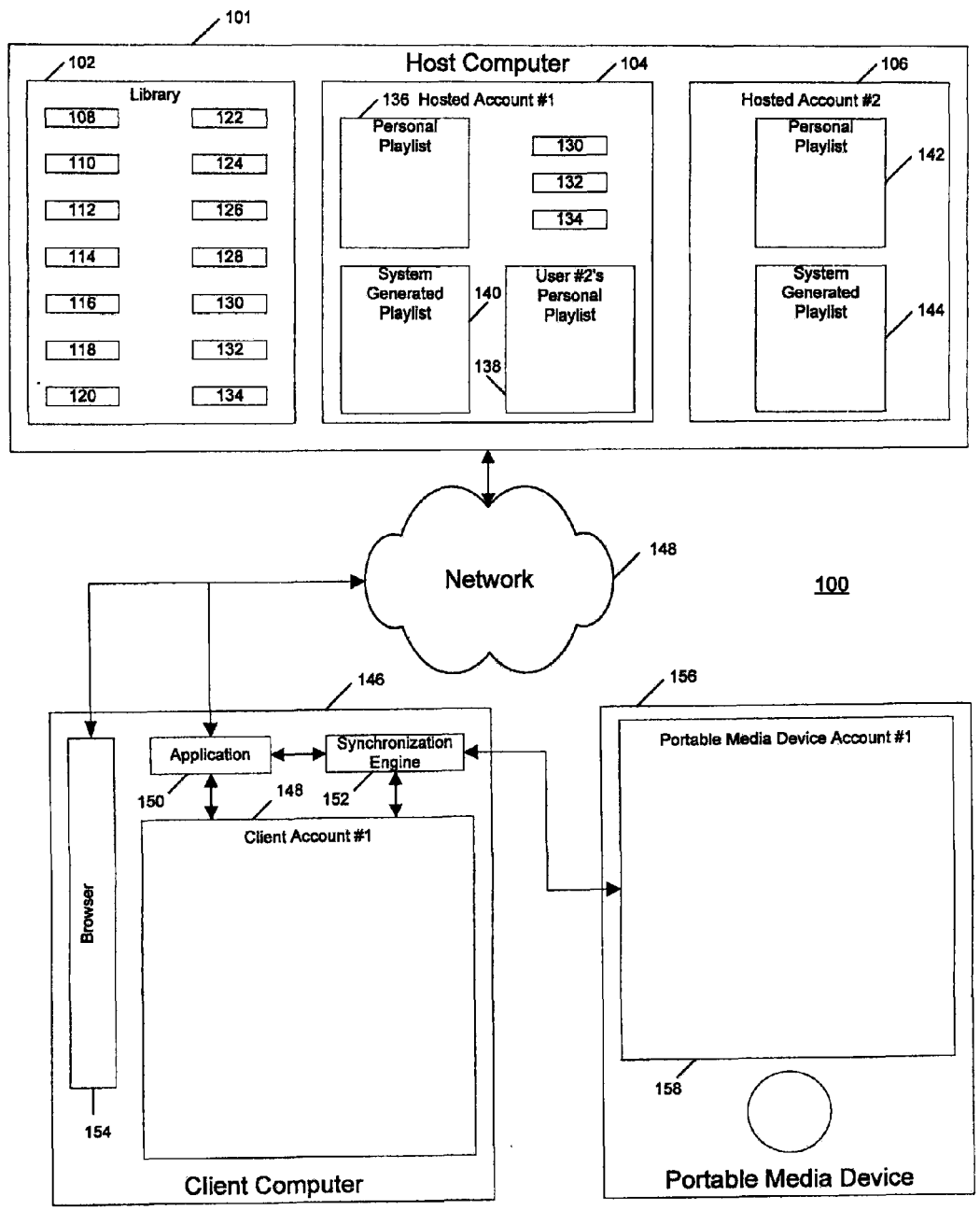
FIG. 1 is a block diagram of a digital asset hosting and distribution system.

In one implementation, a digital asset hosting and distribution system includes a host computer that hosts a library of digital assets and a number of personal accounts. The digital assets may be songs or any other type of computer-readable digital files including, for example, text files, audio files, picture files, or video files. A personal account may include individual digital assets, playlists, or a combination of the two. Playlists are generally collections of one or more individual digital assets.

Playlists may be created manually by a user or they may be generated dynamically (e.g., automatically) by the system. Dynamically generated playlists are generated (e.g., compiled) by the system by selecting a subset of digital assets and perhaps, thereafter, arranging the selected digital assets in a meaningful order. While dynamically generated playlists generally are not generated by users of the system, they may be generated by selecting digital assets from one or more user generated playlists and/or by combining one or more user generated playlists.

Playlists that are generated dynamically by the system may be targeted for all users of the system, they may be targeted for a subset of users of the system, or they may be tailored specifically for an individual user. Criteria used to generate playlists specifically tailored for an individual user may be manually identified by the user or gleaned from the user's activity (e.g., from the user's search patterns or the digital assets accessed by the user).

A user may subscribe to one or more playlists created by other users of the system or by the system itself. When the user subscribes to a playlist, a copy of the playlist is stored in the user's hosted account. When the subscribed-to playlist is modified, the copy of the playlist stored in the user's account is updated accordingly to reflect the modification. In some implementations, the subscribed-to list may itself be based, at least in part, on another subscribed-to list and/or the subscribed-to list may be based, at least in part, on a dynamically generated playlist. Additionally or alternatively, a user may create a playlist by subscribing to two or more other playlists. In such a scenario, the user's playlist may include copies of both of the subscribed-to playlists merged into a single playlist. Then, when either of the subscribed-to playlists is modified, the user's playlist is updated accordingly.

The ability to subscribe to playlists coupled with the availability of dynamically generated playlists allows a user to receive continuously updated content without having to manually modify his own account. For example, a user can receive continuously updated content without ever manually adding or deleting digital assets from the user's account.

The digital asset hosting and distribution system also may allow a user to replicate the user's hosted account on one or more client computers and/or on one or more portable media devices. Updates to a user's hosted account may be downloaded automatically to the user's client account and/or synchronized automatically to the user's portable media device account. Consequently, the digital asset hosting and distribution system may enable the user to maintain client accounts and/or portable media device accounts that mimic the user's hosted account. The ability to automatically update the user's client account and/or portable media device account allows the user to receive continuously updated content on the user's client computer and/or the user's portable media device without having to manually modify the user's hosted account, the user's client account, or the user's portable media device account.

FIG. 1 is an example of a digital asset hosting and distribution system 101. A host computer 101 includes a library of digital assets 102, user account #1 104 and user account #2 106. The library of digital assets 102 includes digital assets 108, 110, 112, 114, 116, 118, 120, 122, 124, 126, 128, 130, 132, and 134. User account #1 104 includes individual digital assets 130, 132, and 134, user #1's personal playlist 136, user #2's personal playlist 138, and a system generated playlist 140. User account #2 includes a personal playlist 142 and a system generated playlist 144.

Host computer 101 is connected to a client computer 146 over a network 148. Generally, client computer 146 is located remotely from host computer 101 and is not associated with host computer 101. For example, client computer 146 may be a personal or laptop computer located in a user's home or office that is capable of accessing host computer 101 over the Internet. Client computer 146 includes client account #1 148, a client application 150, a synchronization engine 152, and a browser (e.g., a web browser) 154. As illustrated, a portable media device 156 is connected to client computer 146 and includes a portable media device account #1 158. The connection between portable media device 156 and client computer 146 may be wired (e.g., a USB connection) or the connection may be wireless (e.g., a Bluetooth connection). Importantly, the connection between portable media device 156 and client computer 146 need not be permanent. Portable media device 156 may be connected to client computer 146 in order to receive digital assets transferred from host computer 101 or client computer 146 to portable media device 156. After digital assets have been transferred to portable media device 156, portable media device 156 can be disconnected from client computer 146 and the transferred digital assets may be accessed (e.g., played or displayed) on the portable media device 156). The client application 150 and the synchronization engine 152 facilitate replicating and updating hosted accounts on client computer 146 and portable media device 156.

Individual user accounts (e.g., hosted accounts 104 and 106) may be created and maintained on host computer 101. This allows users of the digital asset hosting and distribution system 100 to compile, store, and access personalized collections of digital assets available from the library of digital assets 102. For the purposes of illustration, consider that user account #1 104 is associated with user #1 (not shown) and user account #2 106 is associated with user #2 (not shown).

Individual user accounts may include individual digital assets as well as groupings or collections of digital assets (i.e., playlists). For example, user #1's hosted account 104 includes individual digital assets 130, 132, 134 and playlists 136, 138, and 140 and user #2's hosted account includes playlists 142 and 144. An individual user account may include actual copies of the digital assets and playlists stored in the user account. Additionally or alternatively, the individual user account may include records that point to the corresponding digital assets in the library of digital assets 102.

Playlists may include one or more digital assets selected and arranged in a particular order. For example, personal playlist 136 represents a collection of digital assets selected and arranged by user #1 and personal playlist #2 142 represents a collection of digital assets selected and arranged by user #2. In contrast, system generated playlists 140 and 144 represent collections of digital assets selected and arranged by host computer 101.

An individual user of the digital asset hosting and distribution system 100 can subscribe to (e.g., link to) one or more other users' playlists. When a user subscribes to another user's playlist, a copy of the subscribed-to playlist is created in the user's individual user account such that the user can readily access the subscribed-to playlist. In addition, when the subscribed-to playlist is modified, a corresponding update is propagated through the host computer 101 to the copy of the subscribed-to playlist stored in the user's hosted account.

As illustrated in FIG. 1, user #1 subscribes to user #2's personal playlist 142. Consequently, a copy 138 of user #2's personal playlist 142 is stored in user #1's account 104. When user #2's personal playlist 142 is modified by user #2, the copy 138 of user #2's personal playlist 142 is updated correspondingly. For example, user #2's personal playlist 142 may include a collection of songs from the 1980s, including songs recorded by bands such as Def Leppard, Abba, Poison, and Bon Jovi. If user #2 decides to delete all songs recorded by Abba from his personal playlist 142, all songs recorded by Abba also will be deleted from the copy 138 of user #2's personal playlist 142 stored in user #1's hosted account 104. Similarly, if user #2 decides to add a number of songs recorded by Warrant to his personal playlist 142, the songs recorded by Warrant that are added to user #2's personal playlist 142 also will be added to the copy 138 of user #2's playlist 142 stored in user #1's hosted account.

An individual user's account also may include one or more playlists that are generated or updated dynamically (e.g., automatically) by the host computer 101. For example, user #1's hosted account 104 includes system generated playlist 140 and user #2's hosted account 106 includes system generated playlist 144.

Some playlists that are generated dynamically by host computer 101 may be user specific. For example, host computer 101 may generate a "Daily Playlist" for a particular user that includes a list of songs targeted to that user based on that user's personal interests. The host computer 101 may generate a new "Daily Playlist" for each user on a daily basis. The host computer 101 may determine the user's personal interests based on information supplied by the user, or additionally or alternatively, by monitoring the user's personal activity. For example, the host computer 101 may determine the user's personal preferences based on the digital assets stored in the user's hosted account, based on the digital assets accessed most frequently by the user, based on the digital assets browsed by the user, and/or based on search queries for digital assets performed by the user.

Other playlists that are generated dynamically by the host computer 101 may be intended for multiple users. For example, host computer 101 may generate a daily "Top 50 Playlist" intended for multiple users that includes the fifty currently most popular songs available from the library of digital assets 102 or a "New Releases Playlist" intended to promote newly released songs available from the library of digital assets 102.

A user can access host computer 101 from any computer connected to the network 148. After accessing the host computer 101, the user can browse the library of digital assets 102, browse other users' accounts, and/or update or reconfigure the user's personal account.

For example, user #1 can access host computer 101 using client computer 146. After client computer 146 establishes a connection with host computer 101, user #1 may be prompted to enter a username and/or password in order to be granted access to host computer 101. Host computer 101 may use the username and/or password entered by user #1 to verify user #1's identity and/or to associate user #1 with user #1's hosted account 104.

After being granted access to host computer 101, user #1 can use resources available on the host computer (e.g., the library of digital assets 102 and other users' personal accounts) to build, modify, and/or reconfigure user #1's hosted account 104. For instance, user #1 can use the browser 154 to browse the library of digital assets 102 or user #2's hosted account 106. By browsing other user's accounts, user #1 may be exposed to digital assets of interest to user #1 but that user #1 would not have been exposed to otherwise. While browsing, user #1 can add individual digital assets to user #1's hosted account 104 from the library of digital assets 102 or from user #2's hosted account 106. In addition, while browsing, user #1 can subscribe to playlists stored in the library of digital assets 102 or user #2's hosted account 106. While connected to the host computer 101, user #1 also can delete individual digital assets from user #1's hosted account 104. Furthermore, user #1 can create new personal playlists within user #1's hosted account 104, modify existing playlists within user #1's hosted account 104, or reconfigure his/her personal account settings. However, even if user #1 does not modify, reconfigure, or otherwise update his/her hosted account 104, the content (e.g., digital assets) stored in user #1's hosted account 104 may be continually refreshed when user #2's playlist 142 is modified or when dynamically generated playlist 140 is updated. In other words, subscribed-to and dynamically generated playlists provide a user of the digital asset hosting and distribution system 100 with a source of continually refreshed content (e.g., digital assets) without requiring the user to manually modify, reconfigure, or otherwise update his/her hosted account.

The digital asset hosting and distribution system 100 allows users to replicate their hosted accounts on one or more client computers and/or one or more portable media devices. For example, as illustrated in FIG. 1, client account #1 148 on client computer 146 represents a replica of user #1's hosted account 104. Similarly, portable media device account #1 158 on portable media device 156 represents a replica of user #1's hosted account 104. In one implementation, the digital asset hosting and distribution system 100 automatically updates client account 148 and/or portable media device account 158 such that client account 148 and/or portable media device account 158 match user #1's hosted account 104. Additionally or alternatively, user #1 can instruct the digital asset hosting and distribution system 100 manually to update client account 148 and portable media device account 158 to reflect the current content of user #1's hosted account 104.

The ability to replicate hosted account 104 on client computer 146 and/or portable media device 156 allows user #1 to access (e.g., play or display) digital assets stored in user #1's hosted account 104 even when user #1 is offline (i.e., not connected to host computer 101 over network 148). Moreover, automatic updates of client computer account 148 and/or portable media device account 158 to reflect the content of user #1's hosted account 104 provides user #1 with a source of continually refreshed content on client computer 146 and/or portable media device 156 without requiring user #1 to transfer new content to client computer 146 and/or portable media device 156 manually.

Client account 148 and portable media device account 158 may be, but need not be, exact replicas of user #1's hosted account 138. For example, client account 148 and/or portable media device account 158 may not allocate as much memory space for the storage of digital assets as user #1's hosted account and, therefore, client account 148 and/or portable media device account 158 may be incapable of storing as many digital assets as user #1's hosted account 104. As a result, the content stored in client account 148 and/or portable media device account 158 may represent a subset of the content stored in user #1's hosted account 104. Additionally or alternatively, user #1 may obtain and store content (e.g., digital assets) from sources external to the digital asset hosting and distribution system 100 in client account 148 and/or portable media device account 158. Consequently, client account 148 and/or portable media device account 158 may mimic user #1's hosted account only partially, and may include additional digital assets that are not included in the hosted account.

Figure 2:
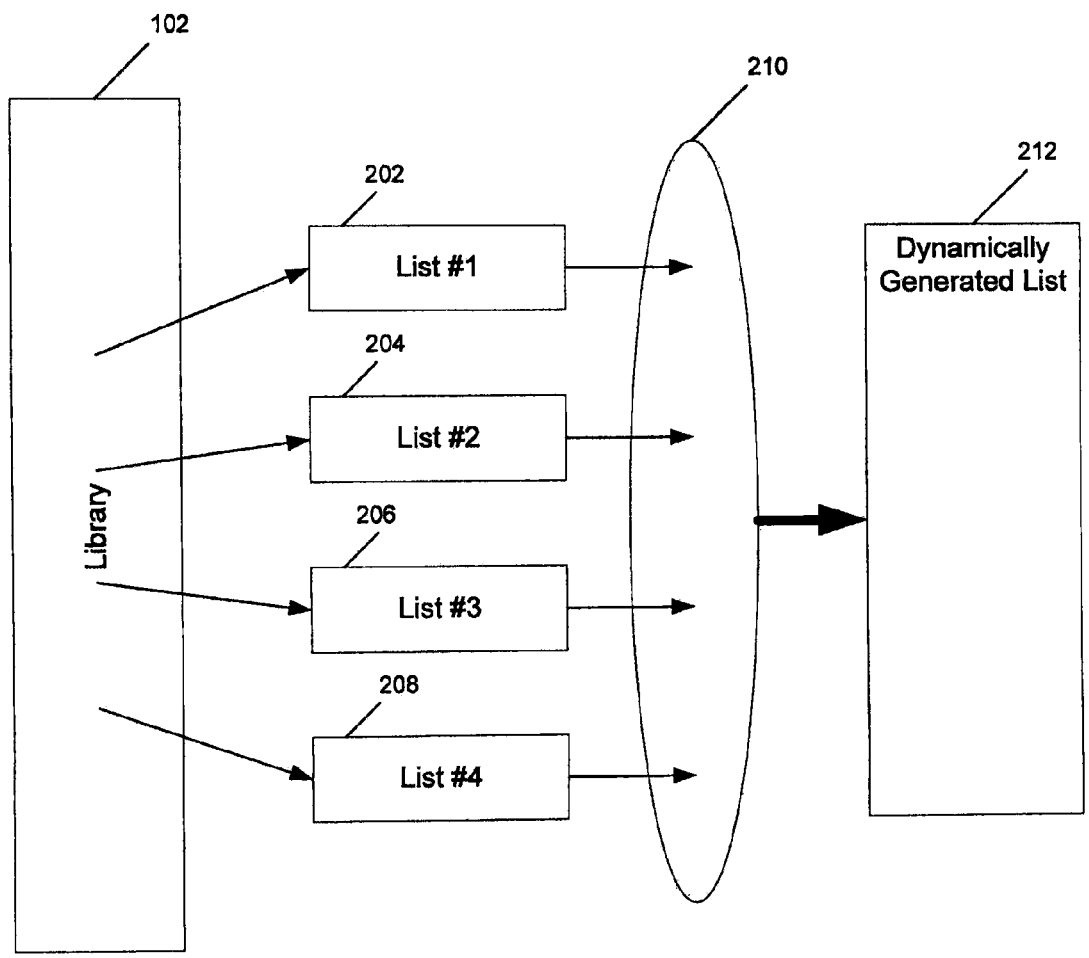
FIG. 2 is a block diagram conceptually illustrating the creation of a dynamically generated playlist.

FIG. 2 is a block diagram that conceptually illustrates one method for creating a dynamically generated playlist. Library of digital assets 102 includes individual digital assets. Individual digital assets in the library of digital assets 102 may be grouped into collections that each include subsets of the digital assets available from the library of digital assets 102. Logic 210 generates dynamically generated playlist 212 by selecting and compiling individual digital assets from collections 202, 204, 206, and 208 based on asset selection rules. Logic 210 includes asset selection rules that may be informed by user preferences manually entered by the user or gleaned by monitoring the user's activity.

Collections 202, 204, 206, and 208 may represent different classifications of digital assets, such as, for example, genres of music. For example, collection 202 may include only songs that are classified as classical music, collection 204 may include only songs that are classified as rock and roll music, collection 206 may include only songs that are classified as rhythm and blues (R&B) music, and collection 208 may include only songs that are classified as country music. The asset selection rules of logic 210 may be configured so as to conform to a user's tastes in different genres of music. If the user is fond of classical music and rock and roll but dislikes R&B and country, the user may configure the asset selection rules of logic 210 such that 40% of the songs included in dynamically generated playlist 212 are drawn from collection 202, 40% of the songs included in dynamically generated playlist 212 are drawn from collection 204, 10% of the songs included in dynamically generated playlist 212 are drawn from collection 206, and 10% of the songs included in dynamically generated playlist are drawn from collection 208.

Additionally or alternatively, collections 202, 204, 206, and 208 may represent playlists created by users of the digital asset hosting and distribution system 100 or dynamically generated by the host computer 101. For example, collection 202 may represent user #1's personal playlist 136, collection 204 may represent system generated playlist 140, collection 206 may represent user #2's personal playlist 142, and collection 208 may represent system generated playlist 144. Logic 210 generates the dynamically generated playlist 212 by selecting and compiling digital assets from user #1's personal playlist 136, system generated playlist 140, user #2's personal playlist 142, and system generated playlist 144. In this way, one dynamically generated playlist may be generated based, at least in part, on one or more additional dynamically generated playlists.

Other asset selection rules are contemplated. The following process, which requires that the collections from which the individual digital assets are drawn be ranked either by a user or the system 100, is an exemplary process for selecting individual digital assets from multiple collections in order to dynamically generate a playlist. Individual digital assets may be drawn from any number of collections and the resulting dynamically generated playlist may include any number of digital assets.

For the first position in the dynamically generated playlist, one digital asset is selected randomly from the highest ranked collection.

For the second position in the dynamically generated playlist, one digital asset is selected randomly from the second highest ranked collection. If there are no eligible digital assets from this collection, then another digital asset is selected randomly from the highest ranked collection. Eligible digital assets may be digital assets that have not already been added to the dynamically generated playlist. If there are no eligible digital assets from the highest ranked collection, then the process may be stopped.

For the third position in the dynamically generated playlist, one digital asset is selected randomly from the lowest ranked collection. Selecting a digital asset from the lowest ranked collection to fill the third position may expose a user to a digital asset that the user would not be exposed to otherwise, since it may be unlikely that the user would select an asset from the lowest ranked collection. If there are no eligible digital assets from the lowest ranked collection, then one digital asset is selected randomly from the highest ranked collection. If there are no eligible digital assets from the highest ranked collection, then one digital asset is selected randomly from the next highest ranked collection containing an eligible digital asset. If there are no eligible digital assets from any collection, the process may be stopped.

For the fourth position in the dynamically generated playlist, one digital asset is selected randomly from the third highest ranked collection. If there are no eligible digital assets from the third highest ranked collection, one digital asset is selected randomly from the highest ranked collection. If there are no eligible digital assets from the highest ranked collection, then one digital asset is selected randomly from the next highest ranked collection containing an eligible digital asset. If there are no eligible digital assets from any collection, the process may be stopped.

Until the dynamically generated playlist is completed or until all of the collections are emptied, the remaining positions in the dynamically generated playlist are filled in the following manner. Collections are processed in a round-robin fashion starting with the highest ranked collection and working down in descending order. One digital asset is selected randomly from each collection. If there are no eligible digital assets from a particular collection, then the collection is skipped and the next highest ranked collection is processed. After the lowest ranked collection is processed, the collections are again processed in a round-robin fashion starting with the highest ranked collection and working down in descending order until all of the remaining positions in the dynamically generated playlist are filled or until all of the collections have been emptied.

Other processes for dynamically generating playlists are contemplated. For example, logic 210 may select and compile digital assets for dynamically generated playlists from any number of collections of digital assets. Furthermore, dynamically generated playlists may be generated based on new releases, editor recommendations, the most popular songs available from the library of digital assets 102, and the most popular songs available within different genres available from the library of digital assets 102.

Figure 3A:
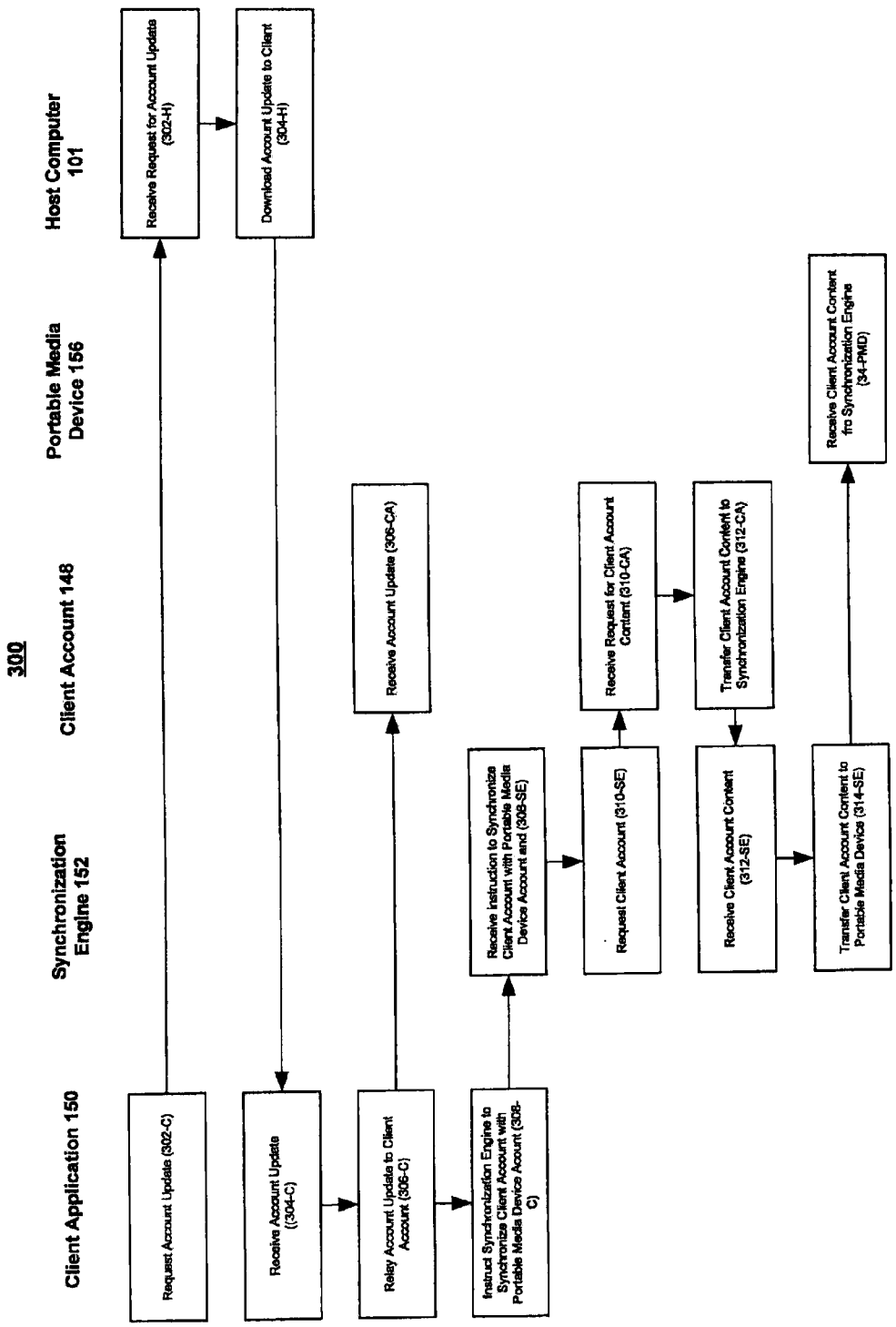
FIG. 3a is a diagram of a process for updating a client account and a portable media device account.

FIG. 3a is a diagram of a process 300 for updating user #1's client account 148 and portable media device account 158 to reflect the current content in user #1's hosted account 104. Updating user #1's client account 148 and/or portable media device account 158 to reflect the content in user #1's hosted account 104 may involve adding one or more songs to user #1's client account 148 and/or portable media device account 158 that have been added to user #1's hosted account 104. Additionally or alternatively, updating user #1's client account 148 and/or portable media device account 158 may include deleting one or more songs from user #1's client account 148 and/or portable media device account 158 that have been deleted from user #1's hosted account 104.

Client application 150 sends an account update request to host computer 101 (302-C). Host computer 101 receives the request for an account update from client computer 146 (302-H) and downloads an account update to client computer 146 (304-H). Client application 150 receives the account update (304-C) and relays the account update to the client account 148 (306-CA). Client account 148 receives the account update (306-CA).

Client application 150 instructs synchronization engine 152 to synchronize the client account 148 with the portable media device account 158 (308-C). Synchronization engine 152 receives the instruction to synchronize the client account 148 with the portable media device account 158 (308-SE) and requests client account content from the client account 148 (310-SE). The client account 148 receives the request for client account content (310-CA) and transfers client account content to the synchronization engine 152 (312-CA). The synchronization engine 152 receives the client account content (312-SE) and transfers the client account content to the portable media device 156 (314-SE). The portable media device 156 receives the client account content (314-PMD).

If portable media device 156 is not connected to client computer 146, the process 300 may terminate after operation 306-CA. If portable media device 156 subsequently is connected to client computer 146, portable media device account 158 may be updated to reflect the most recent account update received by client account 148. For example, any time portable media device 156 becomes connected to client computer 146, client application 150 may detect the connection and automatically initiate the synchronization of the client account 148 with the portable media device account 158.

Many different events may cause client application 150 to request an account update. For example, when portable media device 156 becomes connected to client computer 146, client application 150 may detect the connection of portable media device 156 and request an account update in response. Alternatively, user #1 may instruct client application 150 to request an account update. Further, client application 150 may request an account update on a periodic basis, upon a user log-in, or upon the powering on of client computer 146.

Other processes for updating client and/or portable media device accounts are contemplated. For example, when a user's hosted account is modified, the host computer 101 may download a corresponding update to the user's client computer account automatically. After the update has been downloaded to the client computer, the user's portable media device account may be updated by synchronizing the newly updated client computer account with the portable media device account. Alternatively, the host computer 101 may automatically update a user's client computer account and/or portable media device account on a periodic basis or upon the occurrence of some other triggering event.

In some implementations, client application 150 may initiate an update to user #1's portable media device account 158 without necessarily initiating an update to user #1's client account 148. Client application 150 may automatically initiate such updates to user #1's portable media device account 158. Additionally or alternatively, client application 150 may initiate such updates to user #1's portable media device account 158 in response to a triggering event, such as, for example, user #1's portable media device 156 becoming connected to client computer 146, user #1's hosted account 104 being modified, or user #1 instructing client application 150 to initiate an update to user #1's portable media device account 158. When client application 150 initiates an update of user #1's portable media device account 158 without simultaneously updating user #1's client account 148, client computer 146 may be said to function merely as a conduit or facilitator for the transfer of updates from user #1's hosted account 104 to user #1's portable media device account 158.

Figure 3B:
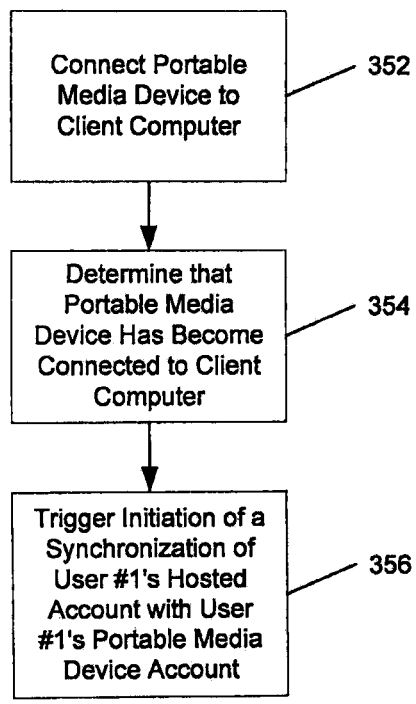
FIG. 3b is a flow chart of a process for updating a portable media device account.

FIG. 3*b* is a flow chart of an example of a process 350 for updating user #1's portable media device account 158. Portable media device 156 is connected to client computer 146 (352). Client application 150 determines that portable media device 156 has become connected to client computer 146 (354). In response to determining that portable media device 156 has become connected to client computer 146, client application 150 automatically triggers initiation of a synchronization of user #1's hosted account 104 with user #1's portable media device account 158 (356).

The synchronization of user #1's hosted account 104 with user #1's portable media device account 158 may include a transfer of at least one song from host computer 101 to client computer 146 to portable media device 156, and the synchronization may be triggered and conditioned upon the determination that the portable media device 156 has become connected to the client computer 146.

A user of the digital asset hosting and distribution system 100 may be able to configure certain parameters related to updating the user's client account and/or the user's portable media device account. For instance, the user may be able to set when and how often updates are downloaded to the user's client account and/or synchronized to the user's portable media device account. The user also may be able to set the maximum number of digital assets to be downloaded to the user's client computer account during a single update and/or the maximum number of digital assets to be synchronized to the user's portable media device account during a single update. The user also may be able to set the total amount of disk space allocated for the user's client account and/or the total amount of disk space allocated for the user's portable media device account. The user also may be able to prioritize the order of the digital assets and/or playlists downloaded to the user's client account and/or synchronized to the user's portable media device during an account update. Alternatively, the digital asset hosting and distribution system 100 may determine and set values for parameters related to updating the user's client account and/or the user's portable media device based on, for example, resource constraints of the host computer, the client computer, and/or the portable media device.

Figure 4A:
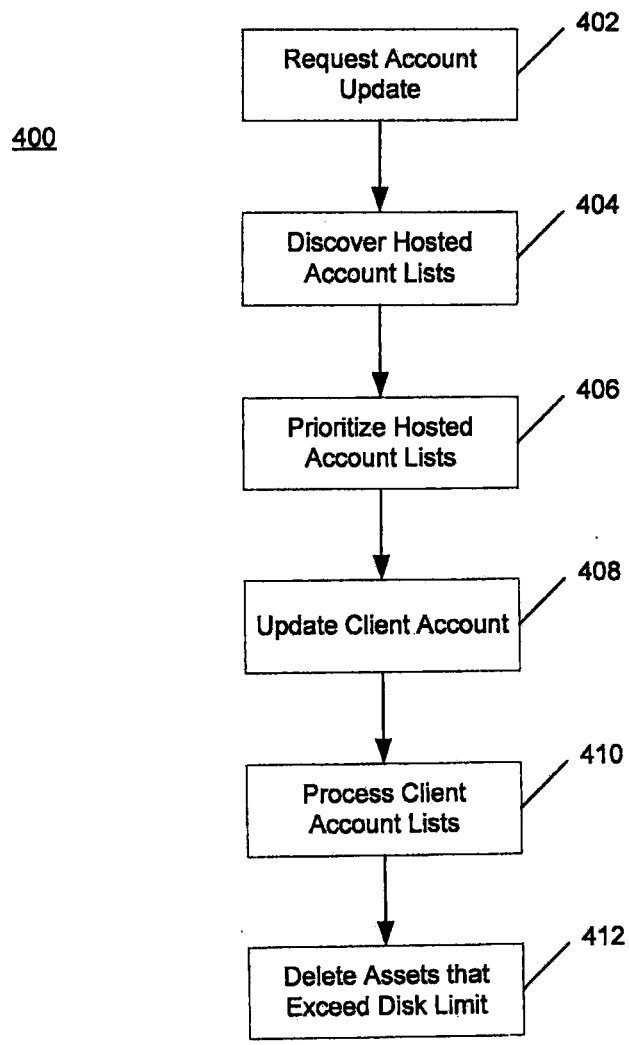
FIGS. 4a-4c are flow charts illustrating a process for updating a client account and a portable media device account.
Figure 4B:
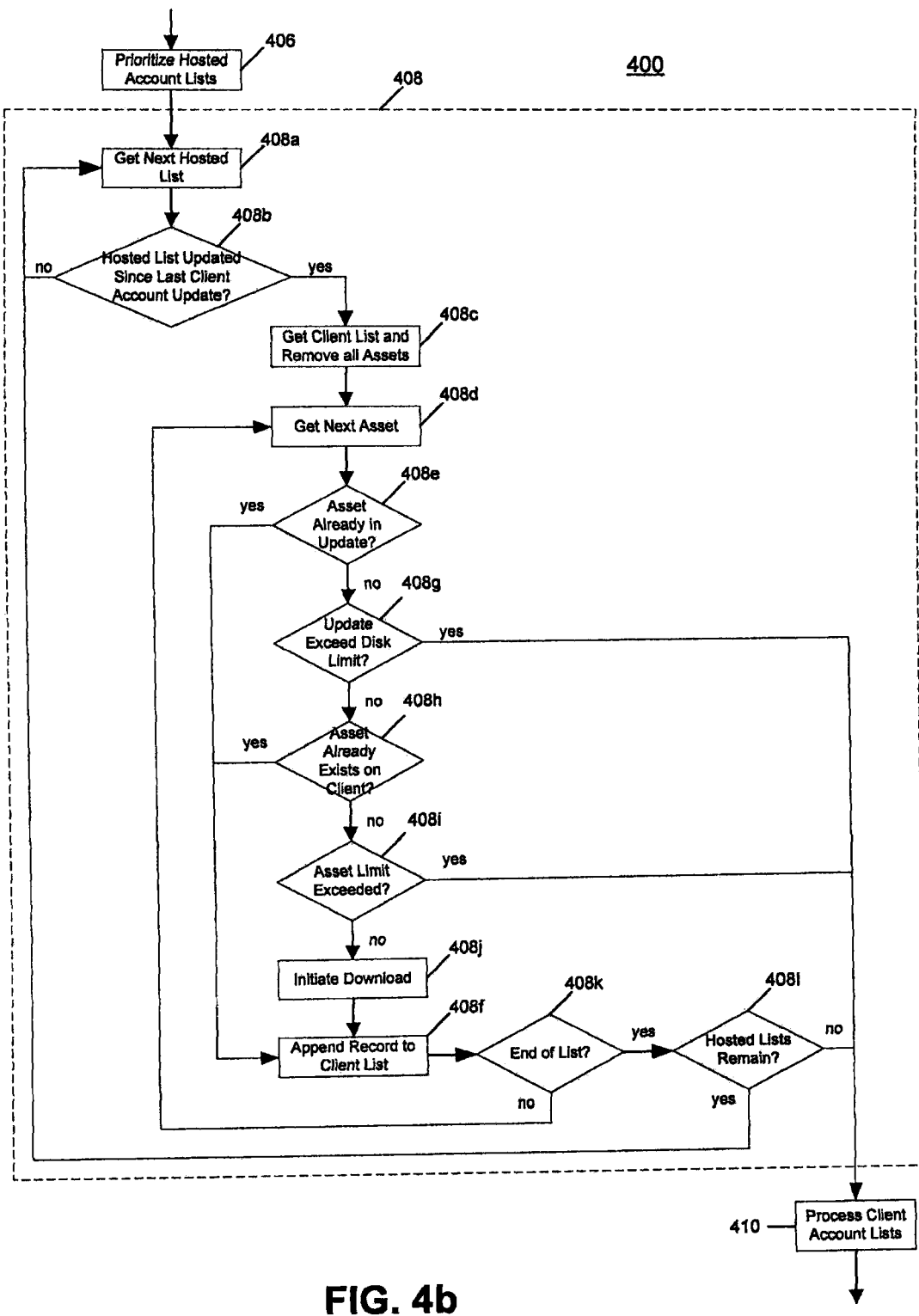
Figure 4C:
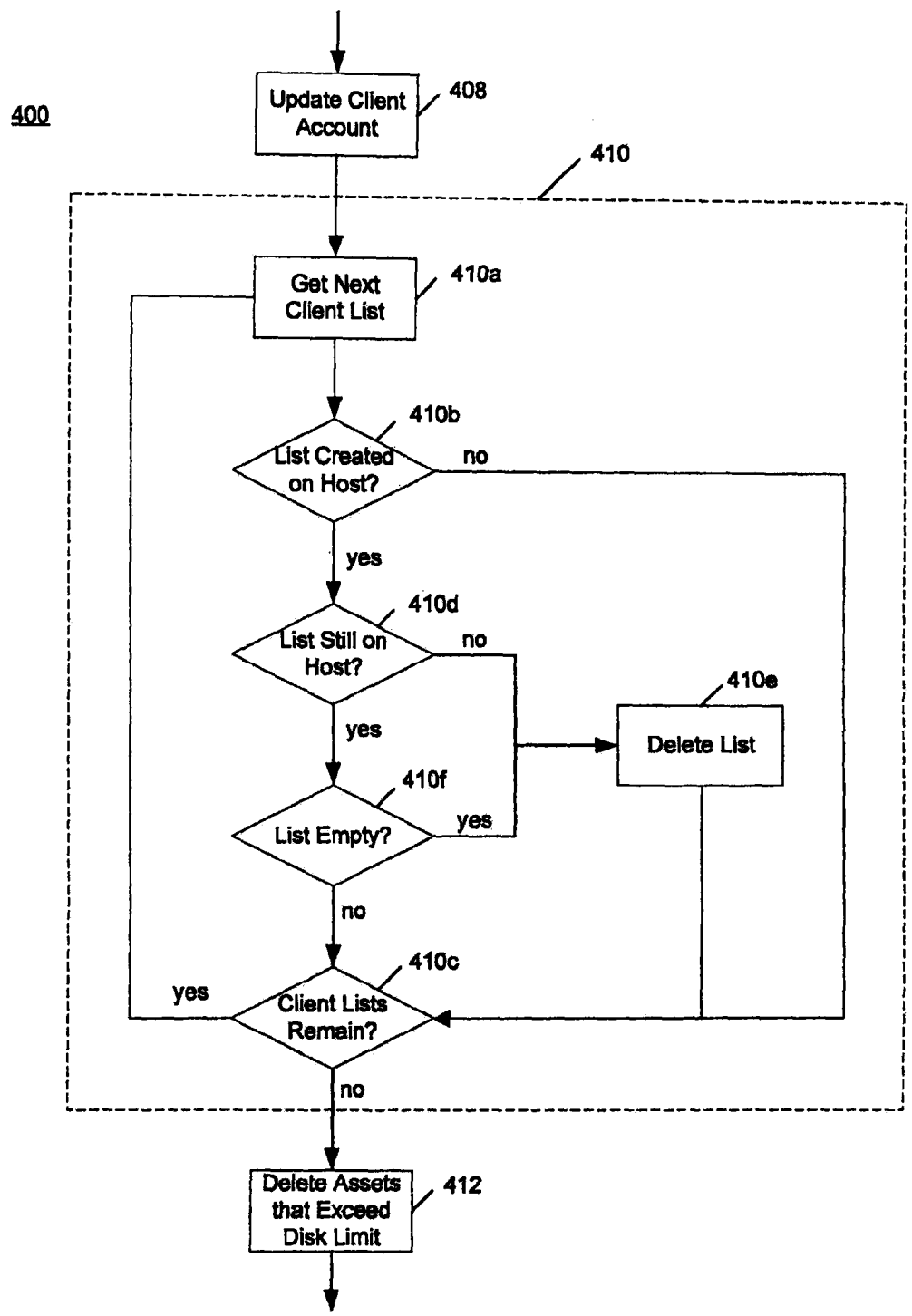

FIGS. 4*a*-4*c* are flow charts illustrating a process 400 for updating a user's client account and portable media device account. Referring to FIG. 4*a*, the process begins by requesting an account update (402). In response to the request for an account update, playlists stored in the user's hosted account are discovered (e.g., identified) (404). The lists discovered in the user's hosted account are then prioritized (406). The lists may be prioritized automatically by the host computer 101 or the lists may be prioritized manually by the user. After the hosted lists have been prioritized, the user's client account is updated (408).

FIG. 4*b* illustrates the operation of updating the user's account 408 in greater detail. The operation of updating the user's account 408 begins by selecting the first hosted list from the prioritized lists (408*a*). A determination is made as to whether the selected hosted list has been updated subsequent to the most recent client account update (408*b*). If the selected list has not been updated since the most recent client account update, the process 400 returns to operation 408*a* and selects the next hosted list from the prioritized lists.

If the hosted list has been updated since the most recent client account update, all of the digital assets in the corresponding client account list are removed (408*c*). The first asset in the hosted list is selected (408d) and a determination is made as to whether the selected asset has already been downloaded to the client account during the current update (408e). If the selected asset already has been downloaded to the client account during the current update, a record pointing to the instance of the selected asset already downloaded to the client account is appended to the appropriate position in the client list (408f).

If the selected asset has not already been downloaded to the client account during the current update, a determination is made as to whether including the selected asset in the current update would cause the current update to exceed the disk space allocated to the client account (408g). If including the selected asset in the current update would cause the current update to exceed the disk space allocated to the client account, the process 400 continues to operation 410.

If including the selected asset in the current update would not cause the current update to exceed the disk space allocated to the client account, a determination is made as to whether the selected asset already exists on the client (408h). If the selected asset already exists on the client, a record pointing to the instance of the selected asset already on the client is appended to the appropriate position in the client list (408f).

If the selected asset does not already exist on the client, a determination is made as to whether including the selected asset in the current update would cause the maximum number of digital assets to be downloaded during a single update to be exceeded (408i). If including the selected asset in the current update would cause the maximum number of digital assets to be downloaded during a single update to be exceeded, the process 400 continues to operation 410.

If including the selected asset in the current update would not cause the maximum number of digital assets to be downloaded during a single update to be exceeded, the selected asset is downloaded to the client account (408j) and a record pointing to the downloaded asset is appended to the appropriate position in the client list (408f).

A determination is made as to whether the selected asset is the last asset remaining in the selected list (408k). If the selected asset is not the last asset remaining in the selected list, the process 400 returns to operation 408d and the next asset is selected from the list. If the selected asset is the last asset remaining in the selected list, a determination is made as to whether any hosted lists remain in the prioritized lists (408l). If hosted lists remain in the prioritized lists, the process 400 returns to operation 408a and the next list is selected from the prioritized lists. If no hosted lists remain, the lists in the client account are processed (410).

FIG. 4c illustrates operation 410 in greater detail. The operation of processing the lists in the client account begins by selecting the first list in the client account (410a). A determination is made as to whether the selected list originated from the hosted account (410b). If the selected list did not originate from the hosted account, the process 400 continues to operation 410c.

If the selected list did originate from the hosted account, a determination is made as to whether the list still exists in the hosted account (410d). If the list no longer exists in the hosted account, the selected list is deleted from the client account (410e) and the process 400 continues to operation 410c. Otherwise, the process continues to operation 410c.

Next, a determination is made as to whether the selected list is empty (i.e., contains no digital assets or no records pointing to digital assets) (410f). If the selected list is empty, the selected list is deleted from the client account (410e) and the process continues to operation 410c.

If the selected list is not empty, a determination is made as to whether additional client lists remain to be processed (410c). If additional client lists remain to be processed, the process 400 returns to operation 410a. If all of the client lists have been processed, the process 400 continues to operation 412 where digital assets that exceed the disk space allocated for the client account are deleted.

FIGS. 5a-5d are block diagrams of a digital asset hosting and distribution system 100 that conceptually illustrate building user #1's hosted account 104 and replicating or updating user #1's hosted account 104 on a client computer 146 and/or a portable media device 156.

Figure 5A:
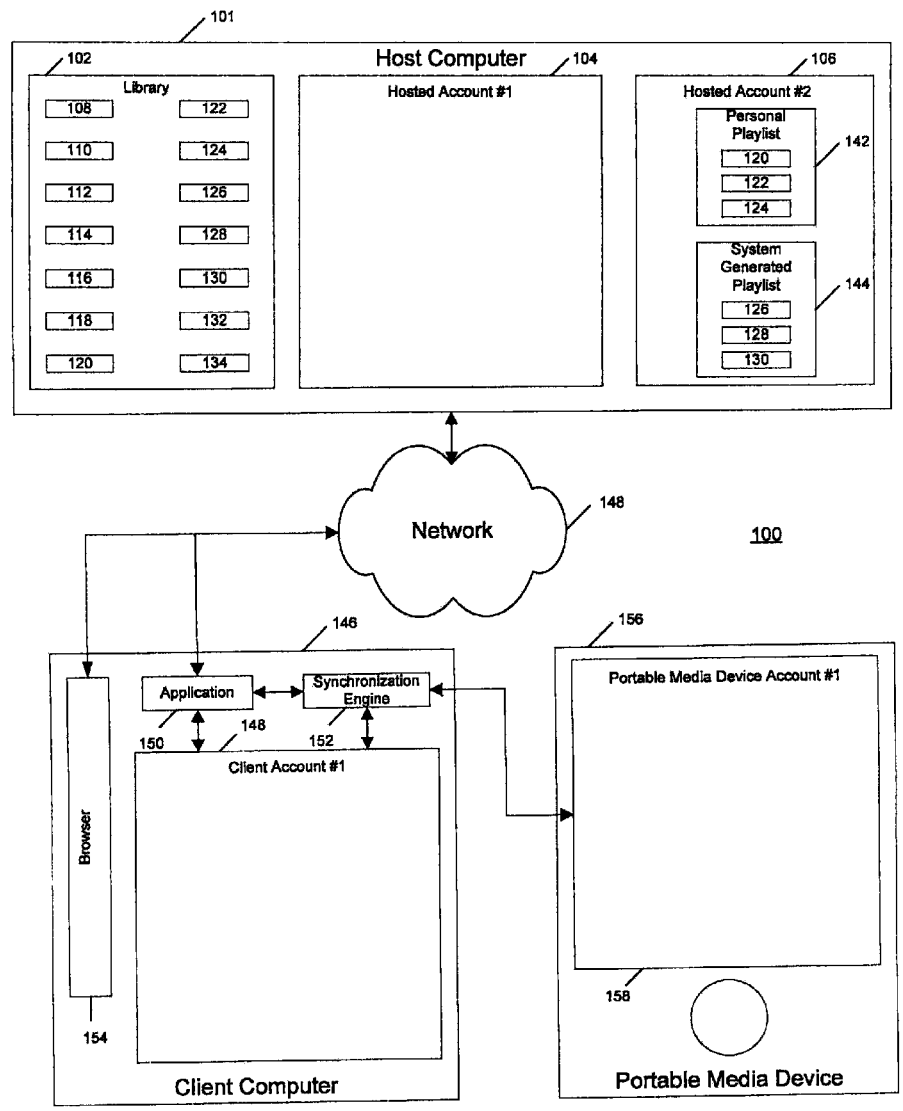
FIGS. 5a-5d are block diagrams of a digital asset hosting and distribution system conceptually illustrating the creation of a hosted account and replicating the hosted account on a client computer and a portable media device.

FIG. 5a illustrates a state of the digital asset hosting and distribution system 100 before user #1's hosted account 104 is populated with digital assets. Library of digital assets 102 includes individual digital assets 108, 110, 112, 114, 116, 118, 120, 122, 124, 126, 128, 130, 132, and 134. User #2's hosted account 106 includes user #2's personal playlist 142 and system generated playlist 144. User #2's personal playlist includes digital assets 120, 122, and 124 and system generated playlist 144 includes digital assets 126, 128, and 130.

User #1's hosted account 104 is empty, client account 148 is empty, and portable media device account 158 is empty. User #1 may use browser 154 to browse the library of digital assets and other users' hosted accounts (e.g., hosted account 106) to discover digital assets and playlists. User #1 may add discovered digital assets and playlists to his/her hosted account 104. User #1 also may subscribe to discovered playlists or allow host computer 101 to populate user #1's hosted account 104 with playlists that are generated dynamically by host computer 101. Additionally or alternatively, user #1 may create, build, and/or rearrange his/her own personal playlist(s).

Figure 5B:
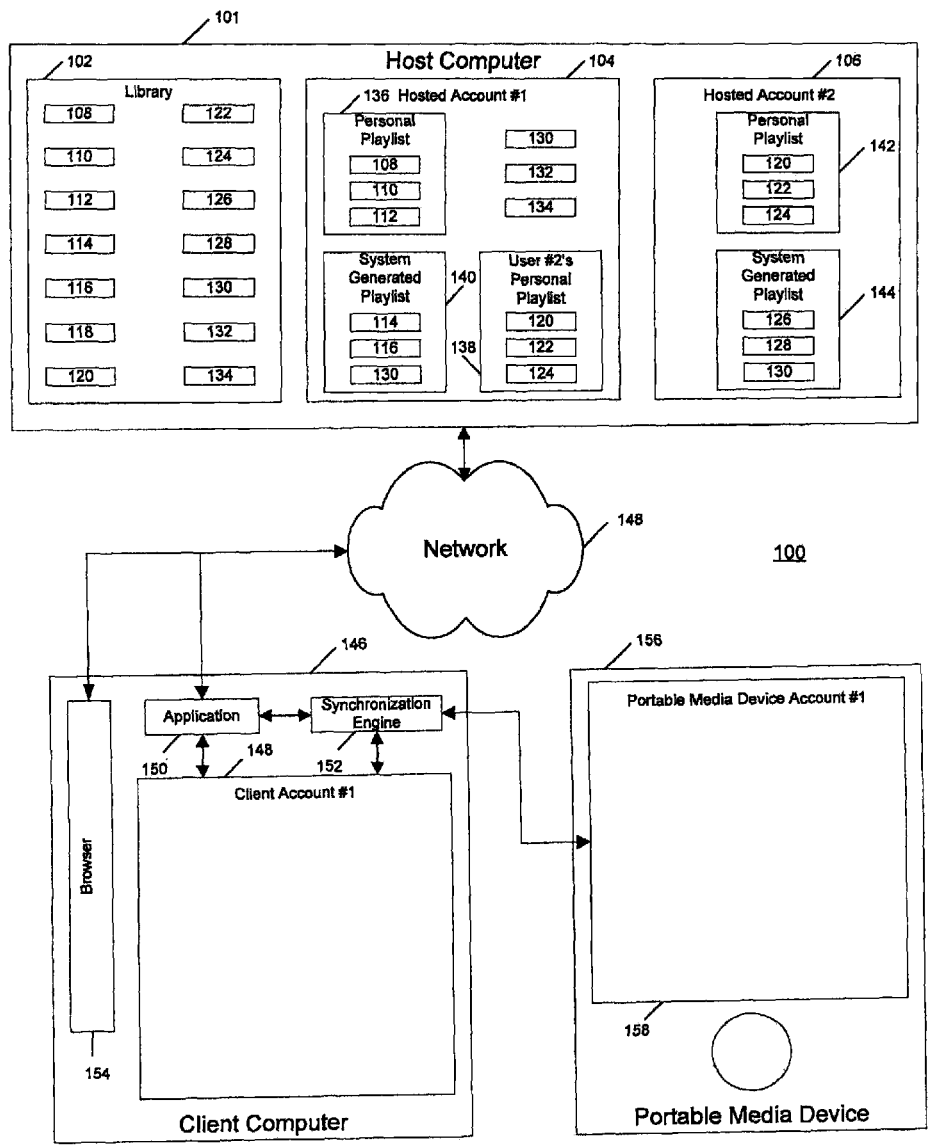

FIG. 5b illustrates a state of the digital asset hosting and distribution system 100 after user #1's hosted account 104 has been populated with digital assets and playlists. User #1's hosted account 104 now includes user #1's personal playlist 136, user #2's personal playlist 138, system generated playlist 140, and individual digital assets 130, 132, and 134. Client account 148 and portable media device account 158 remain empty.

User #1 manually created personal playlist 136 by compiling and arranging digital assets 108, 110, and 112. A copy 138 of user #2's personal playlist 142 appears in user #1's hosted account 104 because user #1 has subscribed to user #2's personal playlist 142. System generated playlist 140 includes digital assets 116, 118, and 130 and was generated dynamically by host computer 101. To create system generated playlist 140, host computer 101 may have drawn digital assets from various collections of digital assets, including, for example, system generated playlist 144. For instance, digital asset 130, included in system generated playlist 140 may have been drawn from system generated playlist 144.

Figure 5C:
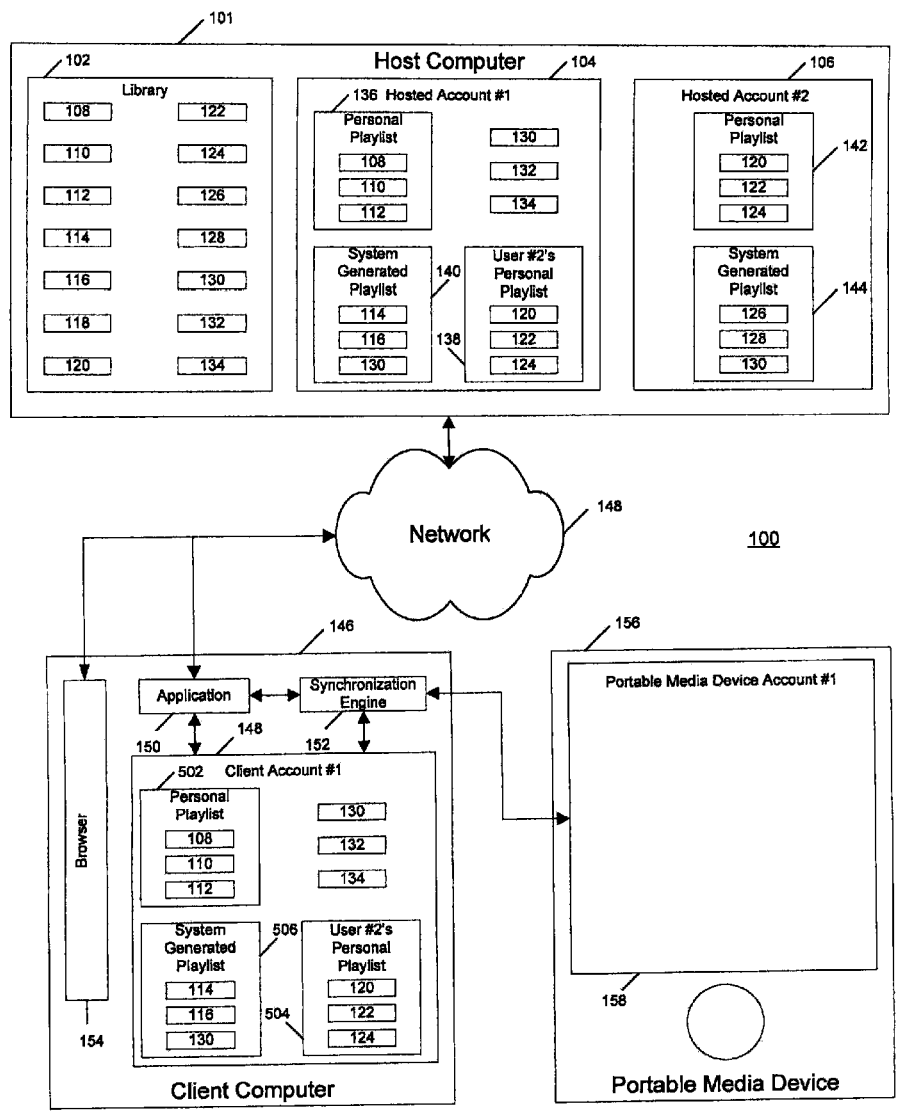

FIG. 5c illustrates a state of the digital asset hosting and distribution system 100 after user #1's hosted account 104 has been replicated on client computer 146. Client account 148 reflects the content of user #1's hosted account 104 as of the time that user #1's hosted account 104 was replicated and includes a copy 502 of user #1's personal playlist 136, a copy 504 of user #2's personal playlist 142, a copy 506 of system generated playlist 140, and digital assets 130, 132, and 134. Client application 150 may initiate an update to client account 148 to reflect the content of user #1's hosted account 104 in response to detecting the connection of portable media device 156 to client computer 146, in response to receiving an instruction from user #1 to update client account 148, or in response to some other triggering event. Additionally or alternatively, client application 150 may initiate an update to client account 148 on a periodic basis.

Figure 5D:
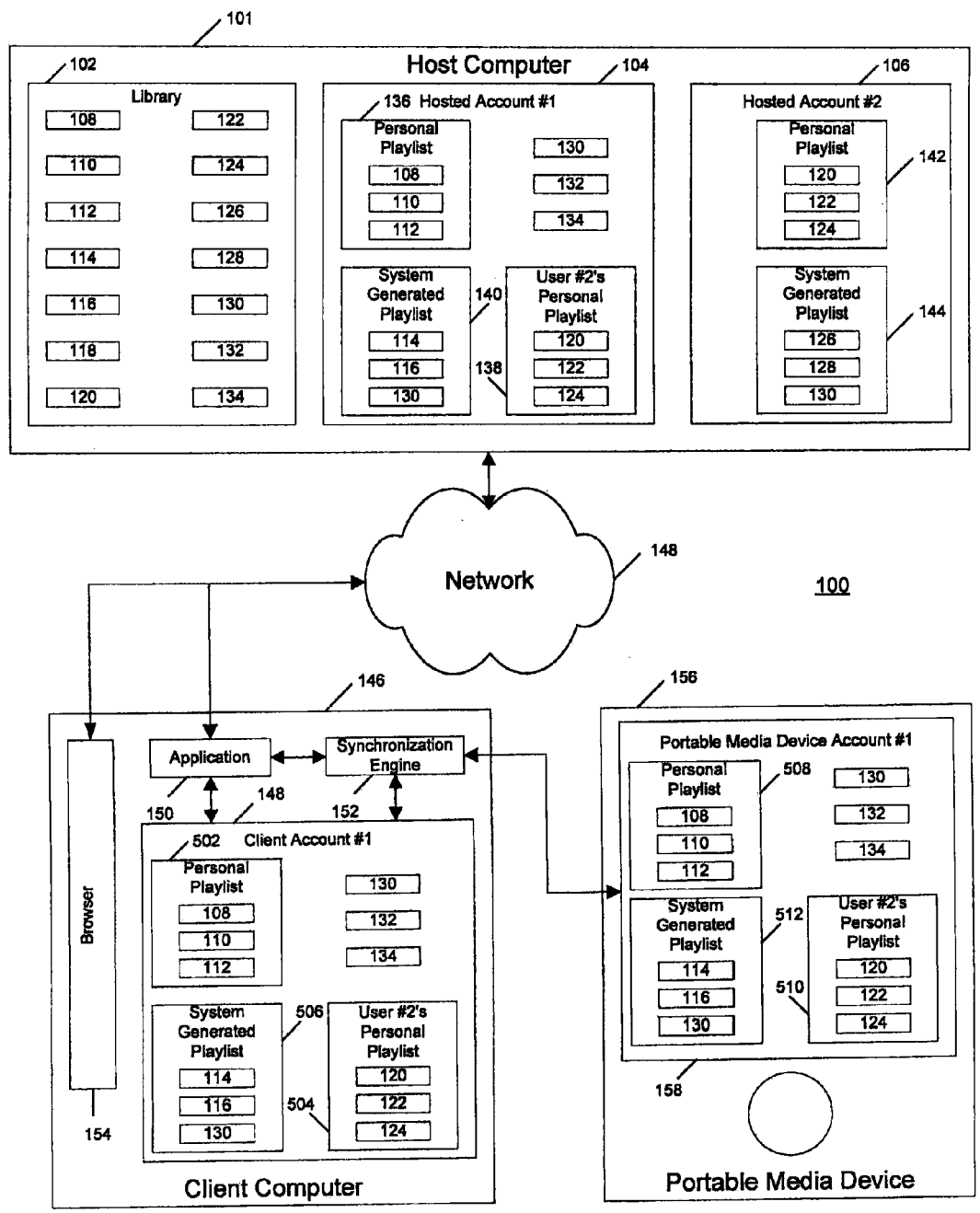

FIG. 5d illustrates a state of the digital asset hosting and distribution system 100 after user #1's hosted account 104 has been replicated on portable media device 156. Portable media device account 158 reflects the content of user #1's hosted account 104 as of the time that user #1's hosted account 104 was replicated and includes a copy 508 of user #1's personal playlist 136, a copy 510 of user #2's personal playlist 142, a copy 512 of system generated playlist 140, and digital assets 130, 132, and 134.

FIGS. 5a-d illustrate user #1's hosted account 104 being replicated and updated on a single client computer 146 and a single portable media device 156. However, user #1's hosted account 104 may be replicated and updated on any number of client computers and/or portable media devices.

A number of implementations have been described. Nevertheless, it will be understood that various modifications may be made. Moreover, the techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

Accordingly, other implementations are within the scope of the following claims.

What is claimed is:

1. A method comprising:
   determining when a portable media device is in communication with a client computer that is separate from a host computer and that interacts with the host computer, wherein the host computer maintains a first collection of content including digital assets; and
   synchronizing the first collection of content resident on the host computer with a second collection of content stored on the portable media device, wherein the synchronization of the first collection with the second collection includes:
      synchronizing the first collection of content with a third collection of content resident on the client computer, wherein synchronizing the first collection of content with the third collection of content comprises a transfer of at least one of the digital assets from the host computer to the client computer, and
      synchronizing, based on the determination that the portable media device is in communication with the client computer, the third collection of content resident on the client computer with the second collection of content resident on the portable media device, wherein synchronizing the third collection of content with the second collection of content comprises a transfer of the at least one of the digital assets from the client computer to the portable media device.

2. The method of claim 1 wherein the first collection comprises a hosted user account, the second collection comprises a portable media device user account, and the digital assets comprise songs.

3. The method of claim 1 wherein the second collection is not identical to the first collection.

4. The method of claim 1, wherein the synchronization of the first collection of content with the third collection of content occurs automatically on a periodic basis.

5. The method of claim 1, wherein the synchronization of the first collection of content with the third collection of content occurs automatically in response to the client computer being powered on.

6. The method of claim 1, wherein the synchronization of the first collection of content with the third collection of content occurs in response to the determination that the portable media device is in communication with the client computer.

7. The method of claim 1, wherein the synchronization of the first collection of content with the third collection of content occurs in response to user instruction.

8. A method comprising:
   identifying a modification of a first collection of content stored on a host computer, wherein the first collection of content includes digital assets; in response to identifying the modification of the first collection, synchronizing the first collection of content resident on the host computer with a second collection of content resident on a portable media device in communication with a client computer that is separated from the host computer and that interacts with the host computer, wherein the synchronization of the first collection with the second collection includes:
      a synchronization of the first collection of content resident on the host computer with a third collection of content resident on the client computer, wherein the synchronization of the first collection with the third collection includes a transfer of at least one of the digital assets from the host computer to the client computer, and
      a synchronization of the third collection of content resident on the client computer with the second collection of content resident on the portable media device, wherein the synchronization of the third collection with the second collection includes the transfer of the at least one digital asset from the client computer to the portable media device.

9. The method of claim 8 wherein the first collection comprises a hosted user account, the second collection comprises a portable media device user account, and the digital assets comprise songs.

10. The method of claim 8 wherein the modification comprises:
    a first modification to the first collection to reflect a second modification made to the second collection of content stored by the host compute.

11. The method of claim 10 wherein the first collection of content comprises a dynamically generated playlist, and wherein the first modification of the first collection of content comprises an update to the dynamically generated playlist.

12. The method of claim 8, wherein the synchronization of the first collection of content with the third collection of content occurs automatically on a periodic basis.

13. The method of claim 8 wherein the synchronization of the first collection of content with the third collection of content occurs in response to a determination that the portable media device is in communication with the client computer.

14. A system comprising:
    a host computer including a hosted collection of content, the hosted collection of content including at least one digital asset;

a portable media device including a device collection of content; and a client computer that is separate from a host computer, the client computer executing a client application, wherein the client computer is configured to interact with the host computer and the portable media device, and wherein the client computer includes a client collection of content, wherein the client application is configured to determine that the portable media device is in communication with the client computer and to automatically synchronize the hosted collection with the device collection based on the determination that the portable media device is in communication with the client computer, and wherein the synchronization of the hosted collection with the device collection includes a synchronization of the hosted collection with the client collection comprising a transfer of the at least one digital asset from the host computer to the client computer, and a synchronization of the client collection with the device collection, comprising a transfer of the at least one digital asset from the client computer to the portable media device.

15. The system of claim 14 wherein the client application is further configured to automatically initiate an update of the content of the client collection to reflect the content of the hosted collection on a periodic basis.

16. The system of claim 14 wherein the client application is further configured to automatically initiate an update of the content of the client collection to reflect the content of the hosted collection in response to the client computer being powered on.

17. The system of claim 14 wherein the client application is further configured to automatically initiate an update of the content of the client collection to reflect the content of the hosted collection in response to a user instruction.

18. A non-transitory computer-readable medium storing instructions that, when executed by a processor, cause the processor to:

determine if a portable media device is in communication with a client computer that is separate from a host computer and that interacts with the host computer; and synchronize a first collection of content that includes digital assets and is resident on the host computer with a second collection of content on the portable media device, wherein the synchronization of the first collection with the second collection includes a synchronization of the first collection of content resident on the host computer with a third collection of content resident on the client computer wherein the synchronization of the first collection with the third collection includes a transfer of at least one of the digital assets from the host computer to the client computer, and a synchronization of the third collection of content resident on the client computer with the second collection of content resident on the portable media device, wherein the synchronization of the third collection with the second collection includes a transfer of the at least one digital asset from the client computer to the portable media device based on the determination that the portable media device is in communication with the client computer.

19. The non-transitory computer-readable medium product of claim 18 wherein the first collection comprises a hosted user account, the second collection comprises a portable media device user account, and the digital assets comprise songs.

20. The non-transitory computer-readable medium product of claim 18 wherein the second collection is not identical to the first collection.

21. The non-transitory computer-readable medium of claim 18 wherein the non-transitory computer-readable medium further includes instructions that, when executed, cause the processor to automatically initiate an update of the content of the third collection to reflect the content of the first collection on a periodic basis.

22. The non-transitory computer-readable medium of claim 18 wherein the non-transitory computer-readable medium further includes instructions that, when executed, cause the processor to automatically initiate an update of the content of the third collection to reflect the content of the first collection in response to the client computer being powered on.

23. The non-transitory computer-readable medium of claim 18 wherein the non-transitory computer-readable medium further includes instructions that, when executed, cause the processor to automatically initiate an update of the content of the third collection to reflect the content of the first collection in response to a user instruction.

* * * * *